United States Patent
Hadano et al.

(10) Patent No.: US 7,663,453 B2
(45) Date of Patent: Feb. 16, 2010

(54) MULTILAYER ELECTRONIC COMPONENT AND MULTILAYER ARRAY ELECTRONIC COMPONENT

(75) Inventors: Kenjiro Hadano, Sabae (JP); Tomohiro Sasaki, Fukui (JP); Yoshihisa Kimura, Okayama (JP); Takafumi Kusuyama, Wakayama-ken (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 12/351,132

(22) Filed: Jan. 9, 2009

(65) Prior Publication Data

US 2009/0134956 A1  May 28, 2009

Related U.S. Application Data

(63) Continuation of application No. PCT/JP2007/058590, filed on Apr. 20, 2007.

(30) Foreign Application Priority Data

Jul. 11, 2006  (JP) .............................. 2006-190993

(51) Int. Cl.
H01G 2/24 (2006.01)
(52) U.S. Cl. .................................................... 333/185
(58) Field of Classification Search ......... 333/181–185, 333/168, 132, 172; 257/797
See application file for complete search history.

(56) References Cited

U.S. PATENT DOCUMENTS 4,758,922 A * 7/1988 Ishigaki et al. ............... 361/330
6,529,102 B2 * 3/2003 Masuda et al. ............... 333/177
2006/0158824 A1 * 7/2006 Kawajiri et al. ............. 361/272

FOREIGN PATENT DOCUMENTS

JP  09-186043 A  7/1997
JP  2005-064267 A  3/2005

OTHER PUBLICATIONS

Official Communication issued in International Patent Application No. PCT/JP2007/058590, mailed on Jul. 24, 2007.
Official communication issued in counterpart Japanese Application No. 2006-190993, mailed on Feb. 19, 2008.
Official communication issued in counterpart Japanese Application No. 2006-190993, mailed on Jul. 24, 2007.
Official communication issued in counterpart International Application No. PCT/JP2007/058590, mailed on Jan. 20, 2009.

* cited by examiner

Primary Examiner—Robert Pascal
Assistant Examiner—Kimberly E Glenn
(74) Attorney, Agent, or Firm—Keating & Bennett, LLP

(57) ABSTRACT

A multilayer array electronic component includes a multilayer composite including a helical coil and a capacitor that are defined by stacking a coil conductor, a capacitor conductor, and a ceramic sheet on one another. External electrodes are arranged on the surface of the multilayer composite and electrically connected to the helical coil or the capacitor. A direction identification mark is arranged on the upper surface of the multilayer composite and electrically connected to any of the external electrodes through the helical coil or the capacitor.

12 Claims, 5 Drawing Sheets

MULTILAYER ELECTRONIC COMPONENT AND MULTILAYER ARRAY ELECTRONIC COMPONENT

BACKGROUND OF THE INVENTION

1. Field of the Invention

The present invention relates to multilayer electronic components and multilayer array electronic components, and more specifically, to a multilayer electronic component and a multilayer array electronic component, each including a multilayer composite including a circuit element that is formed by stacking electrical conductors and insulating layers.

2. Description of the Related Art

A known multilayer array electronic component includes a metallic direction identification mark provided on the upper surface of a multilayer composite (see Japanese Unexamined Patent Application Publication No. 2005-64267). The direction identification mark provides identification of the direction of the multilayer array electronic component, which is asymmetrical and accordingly has a direction in which it should be mounted. The direction identification mark prevents mounting errors and production errors.

However, the direction identification mark is provided on the upper surface of the multilayer composite of the multilayer array electronic component, and it is difficult to form the direction identification mark in a precise shape by electrolytic plating. This problem results in errors in identifying the direction of the multilayer array electronic component. How the error occurs will be described in detail below.

The direction identification mark is formed by electrolytically plating an underlayer with a Ni plating layer and a Sn plating layer. The underlayer is formed of Ag, Pd, Cu, Au, or an alloy of these metals by screen printing or other suitable method.

In order to form the plating layers, a ceramic composite and metal balls are placed in a vessel equipped with a cathode containing a plating solution, and electricity is supplied to the underlayer through the cathode, the metal balls, and the contacts between the metal balls and the underlayer. In order to form sufficiently thick plating layers with relatively small variations among products by electrolytic plating, the metal balls and the underlayer must be in contact with each other over as large an area as possible.

However, the underlayer of the direction identification mark is formed only on the upper surface of the ceramic composite. Therefore, the underlayer may not be sufficiently in contact with the metal balls during electrolytic plating. If the underlayer of the direction identification mark is not in contact with the metal balls, a sufficiently thick plating layer cannot be formed on the underlayer, and the underlayer may be exposed.

In order to identify the direction of the multilayer array electronic component, an image recognizer is typically used. More specifically, the image recognizer photographs the upper surface of the multilayer array electronic component with a camera, and the image is converted into binary data. The shape of the direction identification mark is thus recognized to identify the direction of the multilayer array electronic component. If the underlayer of the direction identification mark is exposed, the image recognizer may not recognize that the exposed portion of the underlayer is a portion of the direction identification mark. Thus, the image recognizer may incorrectly identify the shape of the direction identification mark and fail to correctly identify the direction of the multilayer array electronic component.

SUMMARY OF THE INVENTION

To overcome the problems described above, preferred embodiments of the present invention provide a multilayer electronic component and a multilayer array electronic component including plating layers of a direction identification mark that can be reliably formed so to prevent the direction of the component from being incorrectly identified.

A preferred embodiment of the present invention provides a multilayer electronic component or a multilayer array electronic component that includes a multilayer composite including a circuit element formed by stacking a conductor and an insulating layer. The electronic component includes an external electrode disposed on the surface of the multilayer composite and electrically connected to the circuit element, and a direction identification mark disposed on a predetermined surface of the multilayer composite and electrically connected to the external electrode through the circuit element. This structure allows an electrical supply for forming a plating layer of the direction identification mark to be performed through the external electrode. Thus, the plating layer can be formed to have a sufficient thickness, and multilayer electronic components and multilayer array electronic components that have small variations in the thickness of the plating layer of the direction identification mark. Consequently, the probability of errors when identifying the direction of the multilayer electronic component or multilayer array electronic component is reduced.

The multilayer composite has a plurality of surfaces, and preferably, at least a portion of the external electrode is disposed on a surface other than the predetermined surface. Consequently, when the plating layer is formed by electrolytic plating using metal balls, the metal balls close to the two surfaces, the surface on which the direction identification mark is provided and the surface on which the external electrode is provided, can be sufficiently utilized during the formation of the plating layer.

Preferably, the external electrode covers at least a portion of an edge line defined by an intersection line of two surfaces. Alternatively, the external electrode may cover a corner that is defined by an intersection point of three surfaces. Thus, the external electrode extends between two or three surfaces, and allows the metal balls close to the two or three surfaces to be utilized during the formation of the plating layer of the direction identification mark.

Preferably, the predetermined surface is perpendicular or substantially perpendicular to the direction in which the electrical conductor and the insulating layer are stacked.

Preferably, the circuit element may include a coil and/or a capacitor. The direction identification mark is preferably electrically connected to the external electrode through the coil or the capacitor.

The direction identification mark may preferably include a layer made of Ag, for example.

The structure of the multilayer electronic component or multilayer array electronic component according to preferred embodiments of the present invention allows electrical supply for forming a plating layer of the direction identification mark to be performed through the external electrode. Thus, the plating layer can be formed to a sufficient thickness, and products with small variations in the thickness of the plating layer of the direction identification mark can be obtained. Consequently, the probability of errors when identifying the direction is reduced.

Other features, elements, steps, characteristics and advantages of the present invention will become more apparent from the following detailed description of preferred embodiments of the present invention with reference to the attached drawings.

DETAILED DESCRIPTION OF PREFERRED EMBODIMENTS

A multilayer electronic component and a multilayer array electronic component according to preferred embodiments of the present invention will now be described with reference to the drawings.

First Preferred Embodiment

Figure 1:
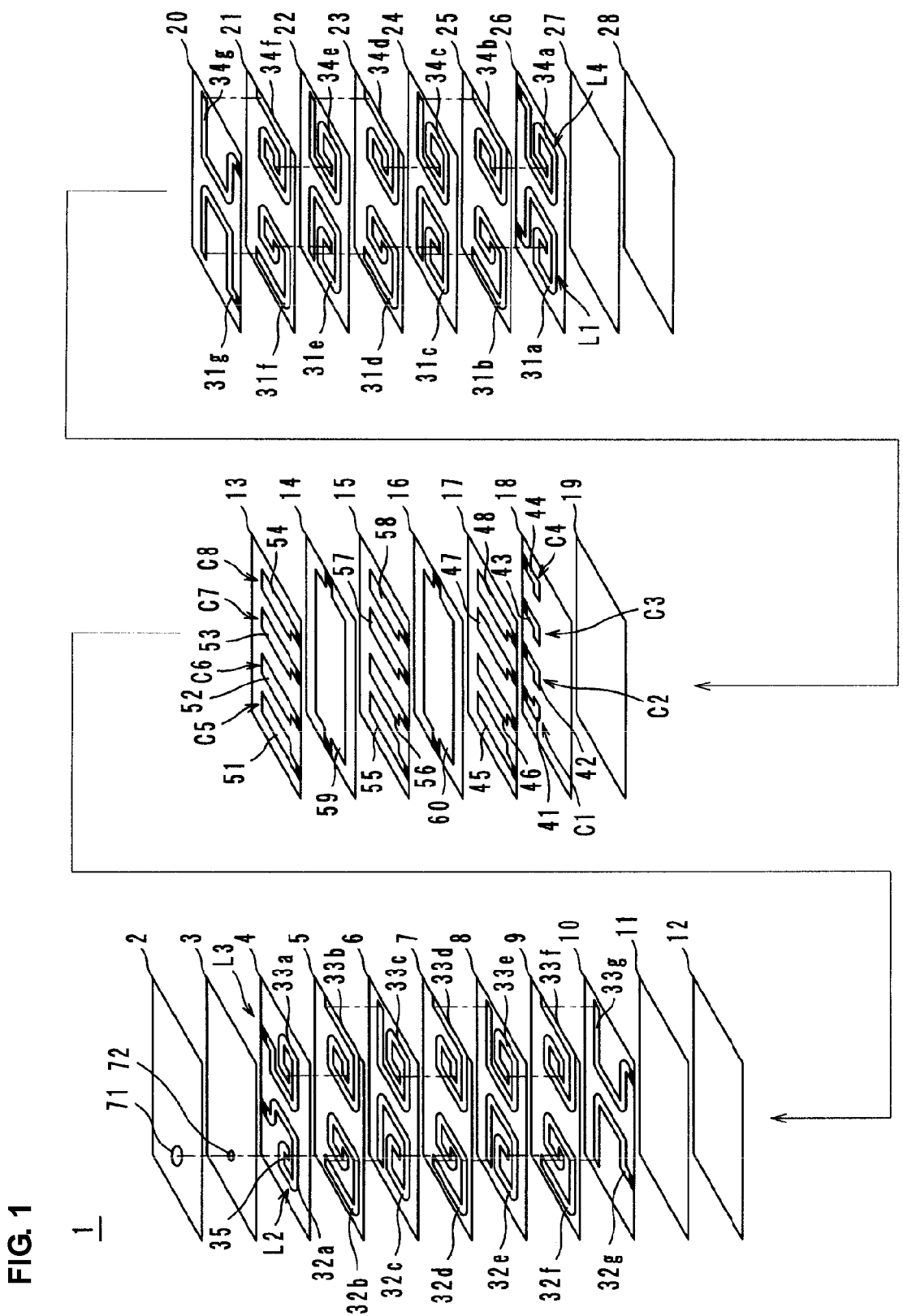
FIG. 1 is an exploded perspective view of a multilayer array electronic component according to a first preferred embodiment of the present invention.
Figure 2:
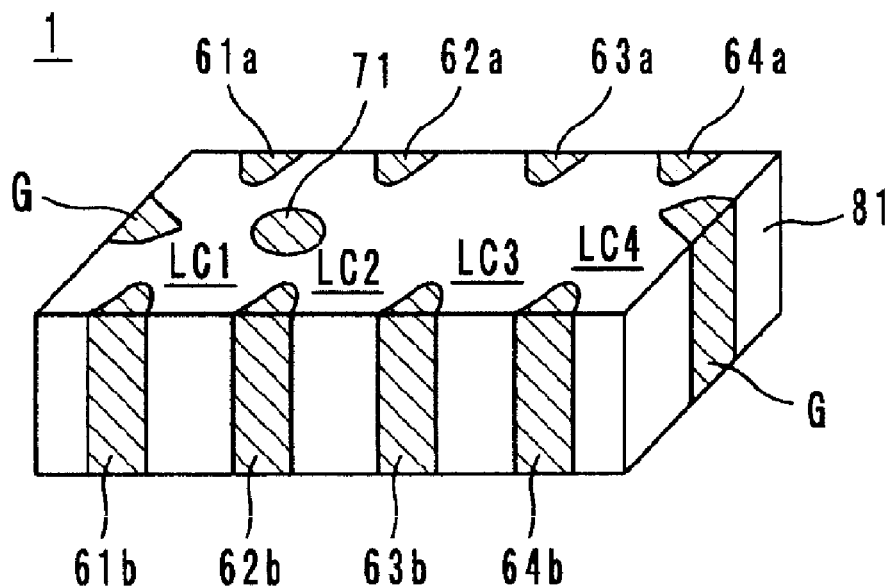
FIG. 2 is an external perspective view of the multilayer array electronic component shown in FIG. 1.
Figure 3:
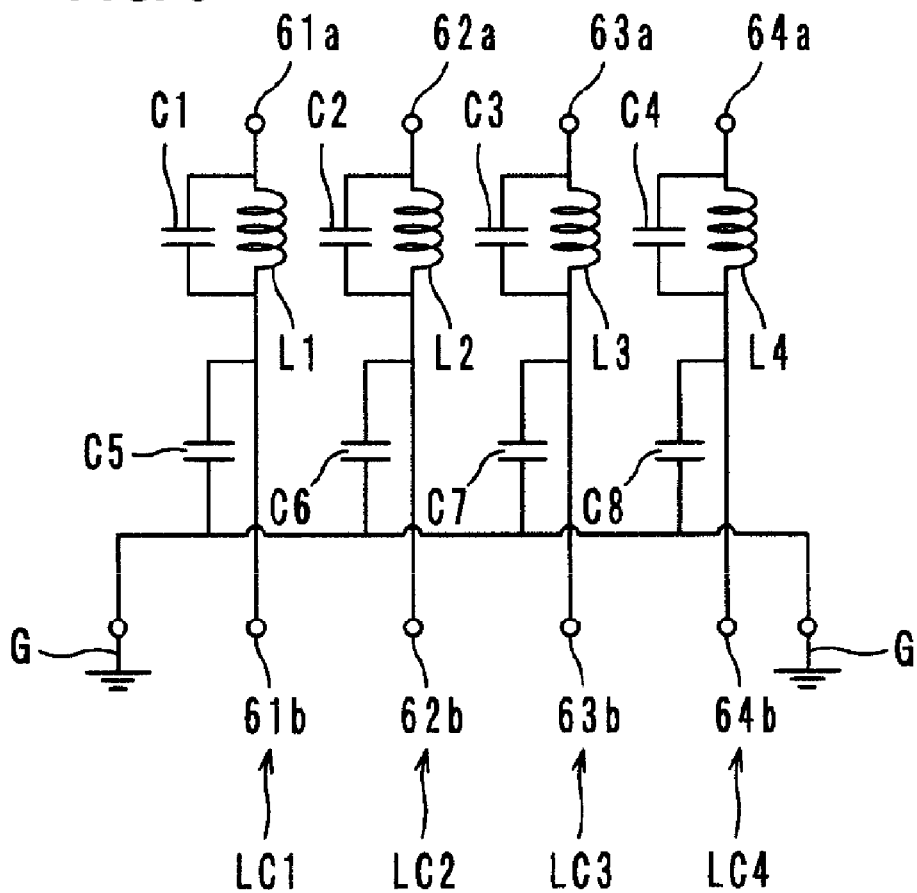
FIG. 3 is an equivalent circuit of the multilayer array electronic component shown in FIG. 1.

FIG. 1 is an exploded perspective view of a multilayer array electronic component 1 according to a first preferred embodiment of the present invention. FIG. 2 is an external perspective view of the multilayer array electronic component 1. FIG. 3 is an equivalent circuit of the multilayer array electronic component 1.

The multilayer array electronic component 1 of the present preferred embodiment includes a plurality of circuit portions, each including at least one circuit element. More specifically, the multilayer array electronic component 1 includes a first LC component LC1, a second LC component LC2, a third LC component LC3, and a fourth LC component LC4 defining the plurality of circuit portions that function as noise filters.

As shown in FIGS. 1 to 3, the first LC component LC1 includes a helical coil L1, a capacitor C1, and a capacitor C5 as circuit elements.

The helical coil (inductor) L1 includes coil conductors 31a, 31b, 31c, 31d, 31e, 31f, and 31g that are electrically connected in series through via-hole conductors 35. The coil conductors 31a, 31b, 31c, 31d, 31e, 31f, and 31g are alternately arranged so that adjacent coil conductors 31 in the vertical direction do not overlap with each other when viewed from above the stack of the multilayer array electronic component 1. Consequently, the stresses caused in the multilayer composite 81 during fabrication thereof can be reduced, so that cracks are prevented from occurring between the adjacent coil conductors 31.

The capacitor C1 includes capacitor conductors 41 and 45 arranged opposite to each other with a ceramic sheet 17 disposed therebetween. The capacitor C5 preferably includes two capacitors connected in parallel. One of the capacitors includes a capacitor conductor 51 and a ground conductor 59 that oppose each other with a ceramic sheet 13 disposed therebetween, and the other includes a capacitor conductor 55 and a ground conductor 60 that oppose each other with a ceramic sheet 15 disposed therebetween.

As shown in FIGS. 1 to 3, the second LC component LC2 includes a helical coil L2, a capacitor C2, and a capacitor C6 as circuit elements.

The helical coil (inductor) L2 includes coil conductors 32a, 32b, 32c, 32d, 32e, 32f, and 32g that are electrically connected in series through via-hole conductors 35. The coil conductors 32a, 32b, 32c, 32d, 32e, 32f, and 32g are alternately arranged so that adjacent coil conductors 32 in the vertical direction do not overlap with each other when viewed from above the stack of the multilayer array electronic component 1.

The capacitor C2 includes capacitor conductors 42 and 46 arranged opposite to each other with a ceramic sheet 17 disposed therebetween. The capacitor C6 includes two capacitors connected in parallel. One of the capacitors includes a capacitor conductor 52 and the ground conductor 59 that oppose each other with a ceramic sheet 13 disposed therebetween, and the other includes a capacitor conductor 56 and the ground conductor 60 that oppose each other with a ceramic sheet 15 disposed therebetween.

As shown in FIGS. 1 to 3, the third LC component LC3 includes a helical coil L3, a capacitor C3, and a capacitor C7 as circuit elements.

The helical coil (inductor) L3 includes coil conductors 33a, 33b, 33c, 33d, 33e, 33f, and 33g that are electrically connected in series through via-hole conductors 35. The coil conductors 33a, 33b, 33c, 33d, 33e, 33f, and 33g are alternately arranged so that adjacent coil conductors 33 in the vertical direction do not overlap with each other when viewed from above the stack of the multilayer array electronic component 1.

The capacitor C3 includes capacitor conductors 43 and 47 arranged opposite to each other with the ceramic sheet 17 disposed therebetween. The capacitor C7 includes two capacitors connected in parallel. One of the capacitors includes a capacitor conductor 53 and the ground conductor 59 that oppose each other with the ceramic sheet 13 disposed therebetween, and the other includes a capacitor conductor 57 and the ground conductor 60 that oppose each other with the ceramic sheet 15 disposed therebetween.

As shown in FIGS. 1 to 3, the fourth LC component LC4 includes a helical coil L4, a capacitor C4, and a capacitor C8 as circuit elements.

The helical coil (inductor) L4 includes coil conductors 34a, 34b, 34c, 34d, 34e, 34f, and 34g that are electrically connected in series through via-hole conductors 35. The coil conductors 34a, 34b, 34c, 34d, 34e, 34f, and 34g are alternately displaced so that adjacent coil conductors 34 in the vertical direction do not overlap with each other when viewed from above the stack of the multilayer array electronic component 1.

The capacitor C4 includes capacitor conductors 44 and 48 arranged opposite to each other with the ceramic sheet 17 disposed therebetween. The capacitor C8 includes two capacitors connected in parallel. One of the capacitors includes a capacitor conductor 54 and the ground conductor 59 that oppose each other with the ceramic sheet 13 disposed therebetween, and the other includes a capacitor conductor 58 and the ground conductor 60 that oppose each other with the ceramic sheet 15 disposed therebetween.

The adjacent LC components LC1 and LC4 are arranged in parallel or substantially in parallel in a direction perpendicular to or substantially perpendicular to the direction in which the ceramic sheets 2 to 28 are stacked. The components LC2 and LC3 that are adjacent to each other in FIG. 1 are arranged in parallel or substantially in parallel in a direction perpendicular to or substantially perpendicular to the direction in which the ceramic sheets 2 to 28 are stacked.

The coil conductors 31a and 34a are arranged on the upper surface of the ceramic sheet 26 at a predetermined interval. Similarly, pairs of coil conductors 31b and 34b, 31c and 34c, 31d and 34d, 31e and 34e, 31f and 34f, and 31g and 34g are arranged on the upper surfaces of the ceramic sheets 25, 24, 23, 22, 21, and 20, respectively, at a predetermined interval. The coil conductors 31a and 34a include lead-out portions exposed at the back side of the ceramic sheet 26, and the coil conductors 31g and 34g have lead-out portions exposed at the front side of the ceramic sheet 20.

The coil conductors 32a and 33a are arranged on the upper surface of the ceramic sheet 4 at a predetermined interval. Similarly, pairs of coil conductors 32b and 33b, 32c and 33c, 32d and 33d, 32e and 33e, 32f and 33f, and 32g and 33g are arranged on the upper surfaces of the ceramic sheets 5, 6, 7, 8, 9, and 10, respectively, at a predetermined interval. The coil conductors 32a and 33a include lead-out portions exposed at the back side of the ceramic sheet 4, and the coil conductors 32g and 33g have lead-out portions exposed at the front side of the ceramic sheet 10.

The direction identification mark 71 is arranged on a predetermined surface of the multilayer array electronic component 1 such that it is not point-symmetric with respect to the approximate center of the predetermined surface. Preferably, the predetermined surface is perpendicular to or substantially perpendicular to the direction in which the ceramic sheets 2 to 28 are stacked. This is because such a surface is commonly used to identify the direction of the multilayer array electronic component 1. In the present preferred embodiment, an elliptical direction identification mark 71 is provided on the upper surface of the ceramic sheet 2, to the left from the center or the approximate center of the ceramic sheet 2. The center refers to the intersection point of the diagonals of the rectangular ceramic sheet 2.

The direction identification mark 71 is preferably electrically connected to a circuit element of the multilayer array electronic component 1. In the present preferred embodiment, the direction identification mark 71 is electrically connected to the helical coil L2 through a via-hole conductor 72.

The capacitor conductors 45 to 48 are each arranged on the upper surface of the ceramic sheet 17 so as to extend backwards from the front of the sheet. The capacitor conductors 45 to 48 include lead-out portions that are exposed at the front side of the ceramic sheet 17. The capacitor conductors 41 to 44 are arranged on the upper surface of the ceramic sheet 18, extending forward from the back of the sheet so as to overlap with the capacitor conductors 45 to 48, respectively, when viewed from above in the stacking direction. The capacitor conductors 41 to 44 include lead-out portions that are exposed at the back side of the ceramic sheet 18.

The capacitor conductors 51 to 54 are each arranged on the upper surface of the ceramic sheet 13 so as to extend backward from the front of the sheet. The capacitor conductors 51 to 54 include lead-out portions exposed at the front side of the ceramic sheet 13. The ground conductor 59 is arranged in a relatively large area on the upper surface of the ceramic sheet 14. The ground conductor 59 includes lead-out portions exposed at both sides of the ceramic sheet 14 in the lateral direction.

The capacitor conductors 55 to 58 are each arranged on the upper surface of the ceramic sheet 15 so as to extend backward from the front of the sheet. The capacitor conductors 55 to 58 include lead-out portions exposed at the front side of the ceramic sheet 15. The ground conductor 60 is arranged in relatively a large area on the upper surface of the ceramic sheet 16. The ground conductor 60 includes lead-out portions exposed at both sides of the ceramic sheet 16 in the lateral direction.

In the present preferred embodiment, the ceramic sheets 2 to 12 and 20 to 28 of the coils are preferably made of a dielectric sheet having a thickness of about 25 μm, for example, and the ceramic sheets 13 to 19 of the capacitors are preferably made of a dielectric sheet having a thickness of about 12.5 μm, for example. The direction identification mark 71, the coil conductors 31a to 34g, the capacitor conductors 41 to 48 and 51 to 58, and the ground conductors 59 and 60 are preferably made of Ag, Pd, Cu, Au, or an alloy of these metals, for example, by screen printing, for example. The via-hole conductors 35 and 72 are preferably formed by making holes with a laser beam or other suitable method and filling the holes with an electroconductive paste, such as of Ag, Pd, Cu, Au, or an alloy of these metals, for example.

The ceramic sheets 2 to 28 on which the above-described structures have been formed are stacked on one another and pressed into a rectangular or substantially rectangular parallelepiped ceramic multilayer composite 81 as shown in FIG. 2. The coils are disposed in upper layers and lower layers of the multilayer composite 81, and the capacitors are disposed in the central layers between the upper layers and the lower layers. The metal direction identification mark 71 is disposed on the upper surface of the multilayer composite 81.

Preferably, underlayers of the external electrodes 61a, 62a, 63a, and 64a are formed on the surface of the multilayer composite 81 so as to electrically connect the circuit elements in the multilayer composite 81 to external circuits. More specifically, the underlayers of the external electrodes 61a, 62a, 63a, and 64a are preferably formed of, for example, Ag, Pd, Cu, Au, or an alloy of these metals on the back side surface of the multilayer composite 81, and each of the underlayers extends to the upper surface and the lower surface of the multilayer composite 81 across the edge lines between the back side surface and the upper surface and between the back side surface and the lower surface, so as to cover a portion of the edge lines.

Preferably, underlayers of the external electrodes 61b, 62b, 63b, and 64b are formed on the surface of the multilayer composite 81 so as to electrically connect the circuit elements in the multilayer composite 81 to external circuits. More specifically, the underlayers of the external electrodes 61b, 62b, 63b, and 64b are preferably formed of, for example, Ag, Pd, Cu, Au, or an alloy of these metals on the front side surface of the multilayer composite 81, and each of the underlayers extends to the upper surface and to the lower surface of the multilayer composite 81 across the edge lines between the front side surface and the upper surface and between the front side surface and the lower surface, so as to cover a portion of the edge lines. Underlayers of ground electrodes G are preferably formed of, for example, Ag, Pd, Cu, Au, or an alloy of these metals on both sides of the multilayer composite 81 in the lateral direction.

The LC components LC1 to LC4 are electrically connected between the underlayers of the external electrodes 61a and 61b, between the underlayers of the external electrodes 62a and 62b, between the underlayers of the external electrodes 63a and 63b, and between the underlayers of the external electrodes 64a and 64b, respectively.

Then, the multilayer composite 81 is fired to yield a sintered ceramic composite. Furthermore, the underlayers of the external electrodes 61a to 64b and the underlayers of the ground electrodes G are preferably plated with Ni and Sn, for example, to form plating layers thereon. Thus, the external electrodes 61a to 64b and the ground electrodes G are completed. In order to form the plating layers, the multilayer composite 81 and metal balls are placed in a vessel equipped with a cathode and including a plating solution, and electricity is applied to the underlayers through the cathode, the metal balls, and the contact between the metal balls and the underlayers.

In the multilayer array electronic component 1 having the above-described structure, the direction identification mark 71 is electrically connected to the external electrodes 62a and 62b via a circuit element, and the external electrodes 62a and 62b are formed across the edge lines. This structure allows the plating layers to be formed to have a sufficient thickness with small variations from other resulting products. Consequently, the probability of errors in identifying the direction of the multilayer array electronic component 1 can be reduced. The reason will now be described in detail below.

During electrolytic plating, electricity is supplied to an underlayer through the contact between the metal balls and the underlayer, and thus, plating layers are formed on the underlayer. This electric supply is achieved even if the metal balls are not in contact with the underlayer to be plated, as long as the underlayer to be plated is electrically connected to another underlayer that is in contact with the metal balls.

For this reason, the underlayer of the direction identification mark 71 and the underlayers of the external electrodes 62a and 62b are formed so as to be electrically connected to each other. Thus, the electric supply for electrolytic plating is achieved not only through the metal balls that are in contact with the direction identification mark 71, but also through the metal balls that are in contact with the external electrode 62a or 62b. Thus, the plating layers of the direction identification mark 71 can be formed by the electric supply through the metal balls in contact with the external electrode 62a or 62b even if the metal balls are not in direct contact with the underlayer of the direction identification mark 71. As a result, electricity is highly reliably supplied to the underlayer of the direction identification mark 71, so that the plating layers can be formed with sufficient thicknesses having small variations. Consequently, the probability of errors in identifying the direction of the multilayer array electronic component 1 is reduced.

Since the underlayers of the external electrodes 62a and 62b are formed so as to cover a portion of the edge lines and extend to the upper surface and to the lower surface, the metal balls located close to the upper and lower surfaces as well as to the back side surface or the front side surface can be involved in the electric supply. Thus, the number of metal balls involved in the electric supply is increased as compared to the case in which the external electrodes 62a and 62b are each formed on only one surface. Accordingly, the likelihood that the underlayers and the metal balls come into contact with each other is increased, and thus, the probability of supplying electricity to the underlayer of the direction identification mark 71 is increased. Thus, the plating layers can be formed with sufficient thicknesses having small variations. Consequently, the probability of errors in identifying the direction of the multilayer array electronic component 1 is reduced.

Figure 4A:
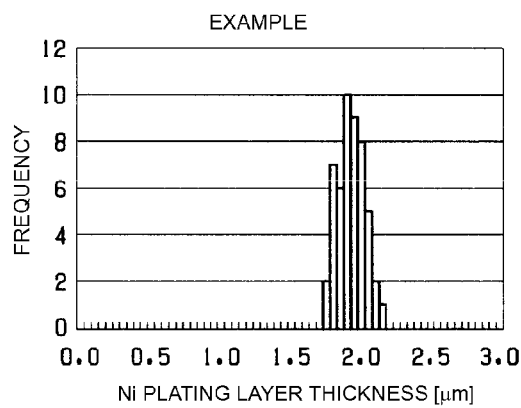
FIG. 4A is a graph of the thickness distribution of the Ni plating layers of the multilayer array electronic components shown in FIG. 1.
Figure 4B:
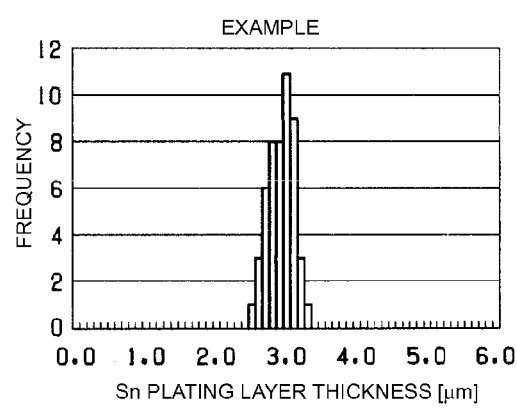
FIG. 4B is a graph of the thickness distribution of the Sn plating layers of the multilayer array electronic components shown in FIG. 1.
Figure 5A:
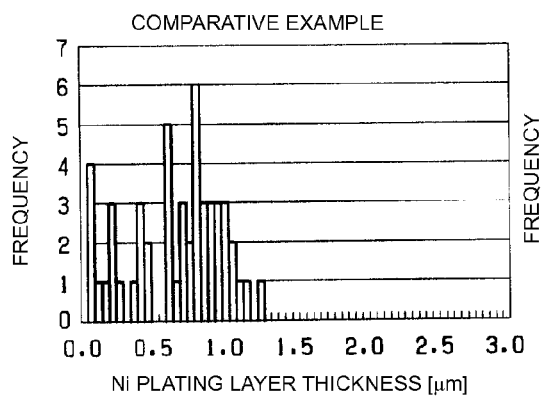
FIG. 5A is a graph of the thickness distribution of the Ni plating layers of multilayer array electronic components according to a comparative example.
Figure 5B:
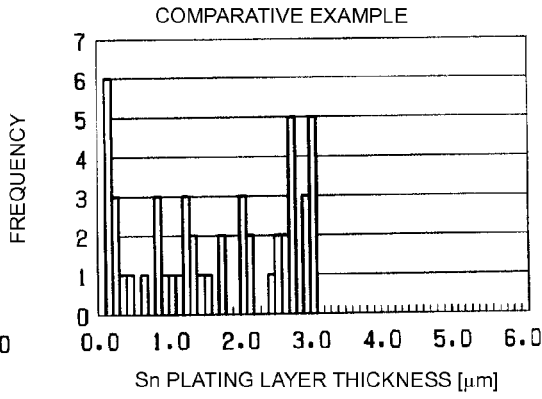
FIG. 5B is a graph of the thickness distribution of the Sn plating layers of the multilayer array electronic components according to the comparative example.

In order to clarify the effect that the multilayer array electronic component 1 produces, the inventors of the present invention performed experiments. More specifically, 50 multilayer array electronic components 1 were prepared as samples of preferred embodiments of the present invention, and 50 multilayer array electronic components, each not including the via-hole conductor 72, were prepared as samples of a comparative example. Then, the thicknesses of the plating layers of the direction identification marks 71 of the prepared multilayer array electronic components were measured. The experimental results will now be described with reference to some figures. FIG. 4A is a graph of the thickness distribution of the Ni plating layers of the multilayer array electronic components 1, and FIG. 4B is a graph of the thickness distribution of the Sn plating layers of the multilayer array electronic components 1. FIG. 5A is a graph of the thickness distribution of the Ni plating layers of the multilayer array electronic components of the comparative example, and FIG. 5B is a graph of the thickness distribution of the Sn plating layers of the multilayer array electronic components of the comparative example. The horizontal axis of each graph shown in FIGS. 4 and 5 represents the thickness (μm) of the plating layer, and the vertical axis represents the frequency (pieces).

While the thicknesses of the Ni plating layers of the multilayer array electronic components 1 were in the range of about 1.8 μm to about 2.2 μm as shown in FIG. 4A, the thicknesses of the Ni plating layers of the multilayer array electronic components of the comparative example were in the range of about 0 μm to about 1.3 μm as shown in FIG. 5A. These results show that the multilayer array electronic components 1 have Ni plating layers with smaller thickness variations than the multilayer array electronic components of the comparative example and that the Ni plating layers of the multilayer array electronic components 1 are thicker than those of the multilayer array electronic components of the comparative example.

While the thicknesses of the Sn plating layers of the multilayer array electronic components 1 were in the range of about 2.5 μm to about 3.4 μm as shown in FIG. 4B, the thicknesses of the Sn plating layers of the multilayer array electronic components of the comparative example were in the range of about 0 μm to about 3.0 μm as shown in FIG. 5B. These results show that the multilayer array electronic components 1 have Sn plating layers with smaller thickness variations than the multilayer array electronic components of the comparative example and that the Sn plating layers of the multilayer array electronic components 1 are thicker than those of the multilayer array electronic components of the comparative example.

By forming the external electrodes 62a and 62b such that each of the external electrodes 62a and 62b is electrically connected to the direction identification mark 71 and covers a portion of the edge lines, as described above, the Ni plating layer and the Sn plating layer of the direction identification mark 71 can be formed to larger thicknesses than those of a known multilayer array electronic component, and products with small thickness variations of the plating layers of the direction identification mark 71 can be obtained. Consequently, the probability of errors in identifying the direction of the multilayer array electronic component 1 can be reduced. The errors result from the image recognizer failing to correctly recognize the shape of the direction identification mark 71 caused by a failure to form the plating layers to sufficient thicknesses so as to completely cover the underlayer. Specifically, the results of the experiments show that about 12% of the multilayer array electronic components of the comparative example failed to form accurate direction identification marks while no multilayer array electronic components 1 of preferred embodiments of the present invention failed to form accurate direction identification marks. The failure to form an accurate direction identification mark means that both the Ni plating layer and the Sn plating layer are not properly formed, or that the Sn plating layer is not properly formed while the Ni plating layer is properly formed.

Although it has been mentioned that the underlayer of the direction identification mark 71 is preferably made of Ag, Pd, Cu, Au, or an alloy of these metals, the structure of the multilayer array electronic component 1 is more advantageous when the underlayer of the direction identification mark 71 is made of Ag, which easily causes ion migration. The reason will now be described in detail.

Ag is a metal more easily causing ion migration than other metals, such as Pd, Cu, and Au. Ion migration refers to a phenomenon in which water comes into contact with a metal to electrolyze the metal and the eluted and dispersed metal ion is reduced to precipitate. If ion migration occurs in the multilayer array electronic component 1, the Ag of the underlayer diffuses in the ground electrodes G and the external electrodes 61*a* and 64*b* around the underlayer. As a result, insulation is deteriorated between the direction identification mark 71 and the ground electrodes G and other electrodes disposed in close proximity to the direction identification mark 71. Therefore, Ni and Sn, for example, which do not easily cause ion migration, preferably cover the underlayer to prevent ion migration.

In manufacturing known multilayer array electronic components, however, it is difficult to form a Ni plating layer and a Sn plating layer of each electronic component to sufficient thicknesses with small variations among the resulting products. The Ag of the underlayer is therefore exposed, and water adsorbs in the exposed Ag to cause Ag ion migration.

Accordingly, in the present preferred embodiment, the Sn plating layer and the Ni plating layer are formed to have sufficient thicknesses by forming the underlayers of the external electrodes 62*a* and 62*b* such that each of the underlayers is electrically connected to the underlayer of the direction identification mark 71 and covers a portion of the edge lines. This increases the degree to which the underlayer is covered with the plating layers to prevent water adsorption in the underlayer. Consequently, insulation between the direction identification mark 71 and the ground electrodes G and other electrodes disposed in close proximity to the direction identification mark 71 can be highly reliably maintained. Thus, the moisture resistance of the multilayer array electronic component 1 is improved.

The inventors of the present invention further performed an experiment to clarify the above-described effect. More specifically, 100 multilayer array electronic components 1 and 100 multilayer array electronic components having the same structure as the comparative example described above were prepared, and the insulation between the direction identification mark 71 and the ground electrodes G was examined under the conditions of temperature of about 60° C. and humidity of about 95%, with a current of about 30 V applied between the ground electrodes G and the external electrodes 61*b* to 64*b*.

According to the results of the experiment, the insulation between the direction identification mark 71 and the ground electrodes G in the multilayer array electronic components of the comparative example was deteriorated in about 31% of the multilayer array electronic components. On the other hand, there were no multilayer array electronic components 1 in which the insulation was deteriorated between the direction identification mark 71 and the ground electrodes G. The results of the experiment show that the multilayer array electronic component 1 is advantageous when the underlayer is made of Ag.

Second Preferred Embodiment

Figure 6:
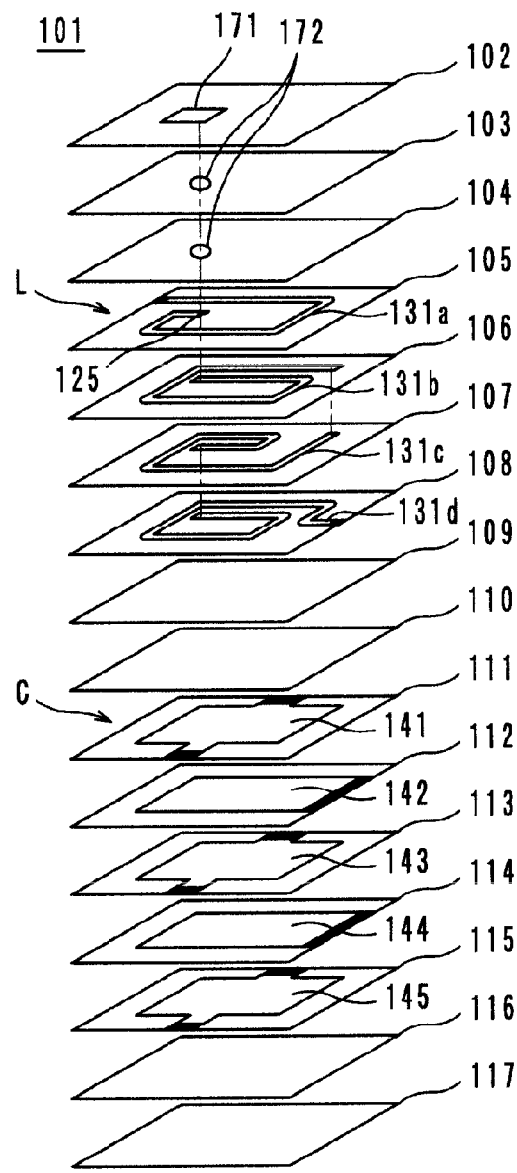
FIG. 6 is an exploded perspective view of a multilayer electronic component according to a second preferred embodiment of the present invention.
Figure 7:
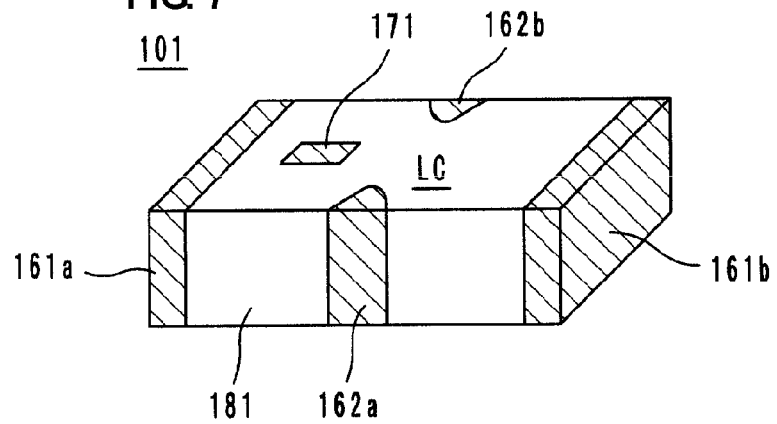
FIG. 7 is an external perspective view of the multilayer electronic component shown in FIG. 6.
Figure 8:
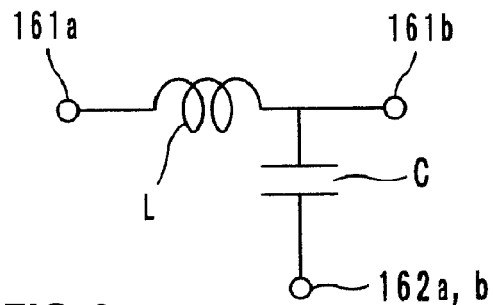
FIG. 8 is an equivalent circuit of the multilayer electronic component shown in FIG. 6.

A multilayer electronic component 101 according to a second preferred embodiment of the present invention will now be described with reference to the drawings. While the foregoing multilayer array electronic component 1 includes a plurality of circuit portions, each including a plurality of circuit elements connected to one another, the multilayer electronic component 101 of the present preferred embodiment includes only one circuit portion. FIG. 6 is an exploded perspective view of the multilayer electronic component 101 according to the present preferred embodiment. FIG. 7 is an external perspective view of the multilayer electronic component 101. FIG. 8 is an equivalent circuit diagram of the multilayer electronic component 101. The following description will concentrate on the differences between the multilayer electronic component 101 and the multilayer array electronic component 1.

Unlike the multilayer array electronic component 1, the multilayer electronic component 101 includes only one circuit portion (LC component LC).

The LC component LC includes a helical coil L and a capacitor C. The helical coil L includes coil conductors 131*a* to 131*d* electrically connected to each other through via-hole conductors 125, as in the multilayer array electronic component 1. However, the multilayer electronic component 101 is different from the multilayer array electronic component 1 in that the coil conductor 131*a* includes a lead-out portion exposed at the left side of the ceramic sheet 105 and in that the coil conductor 131*d* includes a lead-out portion exposed at the right side of the ceramic sheet 108.

The capacitor C includes a capacitor including capacitor conductors 141 and 142 arranged opposite to each other with a ceramic sheet 111 disposed therebetween; a capacitor including capacitor conductors 142 and 143 arranged opposite to each other with a ceramic sheet 112 disposed therebetween; a capacitor including capacitor conductors 143 and 144 arranged opposite to each other with a ceramic sheet 113 disposed therebetween; and a capacitor including capacitor conductors 144 and 145 arranged opposite to each other with a ceramic sheet 114 disposed therebetween. The capacitors are connected to each other in parallel.

Each of the capacitor conductors 141, 143, and 145 includes lead-out portions that are exposed at the front side and the back side of the ceramic sheet 111, 113, or 115. Each of the capacitor conductors 142 and 144 includes a lead-out portion that is exposed at the right side of the ceramic sheet 112 or 114.

The direction identification mark 171 is arranged to the left from the approximate center of the ceramic sheet 102 as in the multilayer array electronic component 1. The direction identification mark 171 is electrically connected to the helical coil L through a via-hole conductor 172 as in the multilayer array electronic component 1.

External electrodes 162a and 162b are respectively provided on the front side surface and the back side surface of a multilayer composite 181, which is a stack of the ceramic sheets 102 to 117, so as to electrically connect the capacitor C to a circuit outside the multilayer electronic component 101 or to the ground.

External electrodes 161a and 161b are respectively provided on the left side surface and the right side surface of the multilayer composite 181 so as to electrically connect the circuit element in the multilayer composite 181 to a circuit outside the multilayer electronic component 101. Unlike the multilayer array electronic component 1, each of the external electrodes 161a and 161b extends to the upper surface, to the lower surface, to the front side surface and to the back side surface of the multilayer composite 181 across edge lines among these surfaces and also covers corners defined by the edge lines.

The LC component LC is electrically connected between the external electrodes 161a and 161b. The external electrodes 161a and 161b are each electrically connected to the direction identification mark 171 via the helical coil L of the LC component LC.

In the multilayer electronic component 101, the direction identification mark 171 is electrically connected to each of the external electrode 161a and 161b covering the edge lines and corners. Therefore, the plating layers of the direction identification mark 171 are formed to have sufficient thicknesses with small variations among the resulting products. Consequently, the probability of errors in identifying the direction of the multilayer electronic component 101 is reduced. The reason will be described below.

Electricity can be supplied to the underlayer of the direction identification mark 171 through the underlayers of the external electrodes 161a and 161b, as in the multilayer array electronic component 1, by electrically connecting the direction identification mark 171 and each of the external electrodes 161a and 161b. Thus, electric supply to the underlayer of the direction identification mark 171 can be highly reliably performed. Thus, the plating layers can be formed to have sufficient thicknesses with small variations among the resulting products. Consequently, the probability of errors in identifying the direction of the multilayer electronic component 101 is reduced.

A corner of the multilayer composite 181 is defined by an intersection point of three surfaces, while an edge line is defined by two surfaces. Accordingly, the multilayer composite 181 allows a larger number of metal balls to be involved in the electric supply than that of the multilayer array electronic component 1, in which the external electrode 61a and other electrodes cover a portion of edge lines defined by two surfaces. Thus, the plating layers can be formed to have sufficient thicknesses with small variations among the resulting products. Consequently, the probability of errors in identifying the direction of the multilayer electronic component 101 is reduced.

Figure 9:
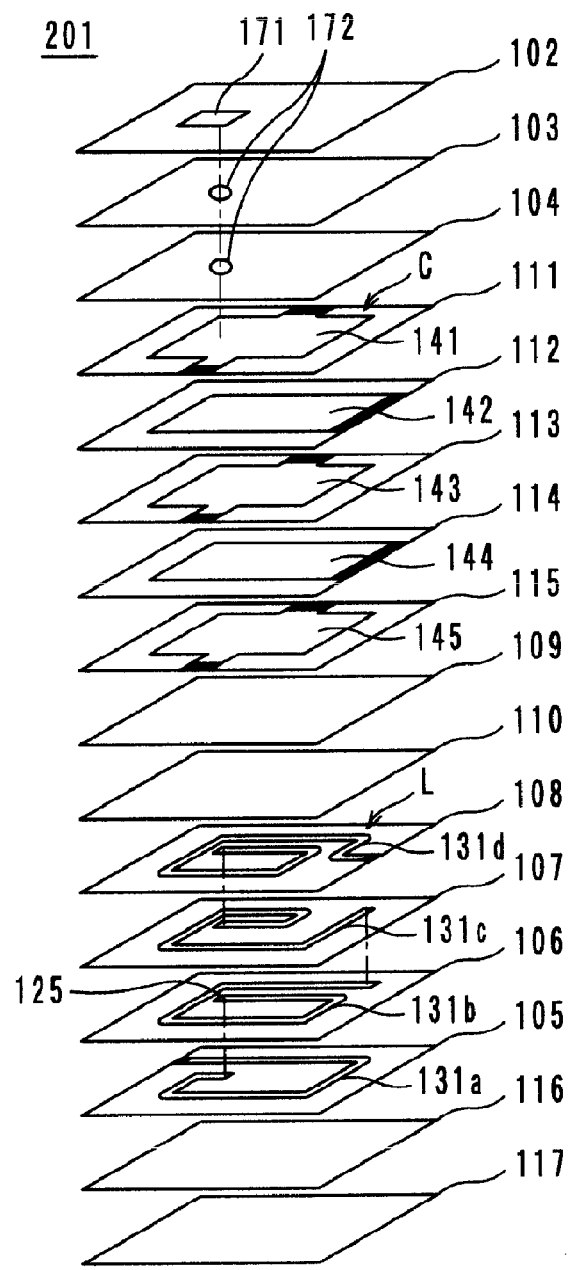
FIG. 9 is an exploded perspective view of a multilayer electronic component according to a modification of the multilayer electronic component shown in FIG. 6.

While the direction identification mark 171 of the multilayer electronic component 101 preferably is electrically connected to the helical coil L, the direction identification mark 171 may preferably be electrically connected to the capacitor C in a multilayer electronic component 201 as shown in FIG. 9, in which the capacitor C is disposed at the upper side in the stacking direction while the helical coil L is disposed at the lower side in the stacking direction.

In the multilayer array electronic component 1 and the multilayer electronic components 101 and 201, it is preferable that the external electrodes be arranged so as to cover edge lines or corners of the multilayer composite. However, this arrangement is not necessary. Each of the external electrodes may be arranged on only a single surface. The reason will be described below.

If each of the external electrodes does not extend over at least two side surfaces unlike in the above-described preferred embodiments, electricity is not supplied through edge lines or corners of the multilayer composite. Accordingly, the electric supply to the underlayer of the direction identification mark is reduced as compared to the structure in which the external electrodes cover edge lines or corners of the multilayer composite. However, even if the corners or the edge lines of the multilayer composite are not covered, the electric supply to the underlayer of the direction identification mark is increased as compared to the known multilayer array electronic component, as long as the underlayers of the external electrodes are electrically connected to the underlayer of the direction identification mark. Thus, the plating layers can be formed to have sufficient thicknesses with small variations among the resulting products even if each of the external electrodes does not extend over at least two side surfaces.

Furthermore, it is preferable that the external electrodes are formed on surfaces other than the surface on which the direction identification mark is formed. This structure allows the metal balls in close proximity to the surfaces to be involved in the electric supply to the underlayer of the direction identification mark, and more metal balls can be involved in the electric supply than in a structure in which the external electrodes and the direction identification mark are disposed on the same surface.

While a multilayer composite is prepared preferably by stacking and firing ceramic sheets having conductors or via-hole conductors in the manufacturing processes of the multilayer array electronic component 1 and the multilayer electronic components 101 and 201, the manufacturing processes are not limited to those described above. For example, the ceramic sheets may be fired in advance. The multilayer array electronic component 1 and the multilayer electronic components 101 and 201 may preferably be manufactured in the following process.

An insulative paste is applied on a substrate by printing or other suitable method to form an insulating layer. Then, an electroconductive paste is applied on the insulating layer to form a conductor or a via-hole conductor. In addition, an insulative paste is applied on the electroconductive material to form an insulating layer. The multilayer array electronic component 1 and the multilayer electronic components 101 and 201 may be manufactured by repeating such a process.

While the helical coil L2 (inductor) and the direction identification mark 71 preferably are electrically connected in the multilayer array electronic component 1, alternatively, the direction identification mark 71 may preferably be connected to any one of the capacitors C1 to C8.

As described above, preferred embodiments of the present invention are advantageous to multilayer electronic components and multilayer array electronic components, and are particularly advantageous in that the plating layers of the direction identification mark can be reliably formed. Consequently, an error in identifying the direction of the resulting multilayer electronic component or multilayer array electronic component does not readily occur.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A multilayer electronic component comprising:
a multilayer composite including a circuit element including an electrical conductor and an insulating layer that are stacked;
an external electrode disposed on a surface of the multilayer composite and electrically connected to the circuit element; and
a direction identification mark disposed on a predetermined surface of the multilayer composite, the direction identification mark being electrically connected to the external electrode through the circuit; wherein
the circuit element is at least one of a coil or a capacitor.

2. The multilayer electronic component according to claim 1, wherein the multilayer composite has a plurality of surfaces, and at least a portion of the external electrode is disposed on a surface other than the predetermined surface.

3. The multilayer electronic component according to claim 2, wherein the external electrode is arranged to cover at least a portion of an edge line that is an intersection line of two of the surfaces.

4. The multilayer electronic component according to claim 2, wherein the external electrode is arranged to cover a corner that is an intersection point of three of the surfaces.

5. The multilayer electronic component according to claim 1, wherein the predetermined surface is substantially perpendicular to a direction in which the electrical conductor and the insulating layer are stacked.

6. The multilayer electronic component according to claim 1, wherein the direction identification mark includes a layer made of Ag.

7. A multilayer array electronic component comprising:
a multilayer composite including a circuit element that includes an electrical conductor and an insulating layer that are stacked;
an external electrode disposed on a surface of the multilayer composite and electrically connected to the circuit element;
a direction identification mark disposed on a predetermined surface of the multilayer composite, the direction identification mark being electrically connected to the external electrode through the circuit element; wherein
the circuit element is at least one of a coil or a capacitor.

8. The multilayer array electronic component according to claim 7, wherein the multilayer composite has a plurality of surfaces, and at least a portion of the external electrode is disposed on a surface other than the predetermined surface.

9. The multilayer array electronic component according to claim 8, wherein the external electrode is arranged to cover at least a portion of an edge line that is an intersection line of two of the surfaces.

10. The multilayer array electronic component according to claim 8, wherein the external electrode is arranged to cover a corner that is an intersection point of three of the surfaces.

11. The multilayer array electronic component according to claim 7, wherein the predetermined surface is substantially perpendicular to a direction in which the electrical conductor and the insulating layer are stacked.

12. The multilayer array electronic component according to claim 7, wherein the direction identification mark includes a layer made of Ag.

* * * * *